(12) United States Patent
Jain et al.

(10) Patent No.: US 9,160,336 B2
(45) Date of Patent: Oct. 13, 2015

(54) SYSTEM AND METHOD FOR CRITICAL PATH REPLICATION

(71) Applicant: STMicroelectronics International N.V., Amsterdam (NL)

(72) Inventors: Abhishek Jain, Delhi (IN); Chittoor Parthasarathy, Greater Noida (IN); Kallol Chatterjee, Kolkata (IN)

(73) Assignee: STMICROELECTRONICS PVT LTD, Amsterdam (NL)

( * ) Notice: Subject to any disclaimer, the term of this patent is extended or adjusted under 35 U.S.C. 154(b) by 188 days.

(21) Appl. No.: 13/715,721

(22) Filed: Dec. 14, 2012

(65) Prior Publication Data

US 2014/0167812 A1    Jun. 19, 2014

(51) Int. Cl.
*G06F 17/50* (2006.01)
*H03K 19/003* (2006.01)

(52) U.S. Cl.
CPC .......... *H03K 19/003* (2013.01); *G06F 17/5045* (2013.01); *G06F 2217/12* (2013.01)

(58) Field of Classification Search
CPC ...................................... G06F 17/50

USPC .......................................... 716/103
See application file for complete search history.

(56) References Cited

U.S. PATENT DOCUMENTS

2004/0243964 A1*  12/2004  McElvain et al. ............... 716/12

* cited by examiner

*Primary Examiner* — Thuan Do
(74) *Attorney, Agent, or Firm* — Slater & Matsil, L.L.P.

(57) ABSTRACT

Disclosed is a system and method for providing a critical path replica system in a circuit. A critical path replica system is created by determining a critical path in a circuit, generating a critical path replica circuit, generating a circuit blueprint, and creating the blueprinted circuit. The circuit comprises a functional logic module having functional logic elements and replica logic modules having logic elements. Each logic element is configured to replicate one or more of the functional logic elements and process a test signal. A replica error detection module analyzes the processed signal to determine whether a timing violation has occurred. In some embodiments, the replica logic module further comprises one or more load modules. A replica controller may modify operation of the circuit based on reported errors. A replica mode select module sets the replica logic module to an aging test mode or a timing sensor mode.

19 Claims, 4 Drawing Sheets

SYSTEM AND METHOD FOR CRITICAL PATH REPLICATION

TECHNICAL FIELD

The presented principles relate to replication of critical paths in integrated circuits. These principles also relate to the control and testing of the timing of functional and replicated critical integrated circuit paths.

BACKGROUND

Integrated circuits (ICs) are frequently manufactured with hundreds of millions of transistors. As the size of transistors shrinks, the number of transistors in any given area of an integrated circuit rises. These transistors form discrete components such as logic gates. For example, NAND, NOR, AND, OR and XOR gates are formed form COMS transistors. In turn, various logic gates may be combined to form more sophisticated structures such as adders, registers, or the like. Transistors and logic gates are frequently used in processors to interpret and implement instructions during execution of software programs. Similarly, embedded systems may have instructions residing in system memory, and a processor may access and execute those instructions using transistors or logic gates.

When transistors in an IC are formed, they are generally formed during the same fabrication process. However, imperfections in the fabrication process can lead to transistors fabrication in a single process exhibiting some variation on operating parameters. Likewise, transistors from different ICs may exhibit variations in operating parameters due to variations in the fabrication process. For example, transistors may have dopants applied to source and drain regions. However, the dopant application or concentrations may not be perfectly uniform cross transistors in a single chip, or across different chips. As another example, a gate oxide may be created by bringing oxygen into contact with the silicon surface under controlled heat and pressure conditions. The inconsistencies in oxygen concentration at the wafer surface during gate oxide formation may result in some slight inconsistencies in the thickness of different transistors' gate oxide, and by extension, cause inconsistencies in the operation of the transistors. In some instances, a high-k dielectric or oxynitride may be used to form a gate oxide, with those materials being deposited, for example, by chemical vapor deposition. The deposition of these materials may have slight inconsistencies, and may lead to irregularities in the gate oxide thickness and operating parameters of the transistors.

Another issue encountered with transistors is aging transistors during actual use. Dopant migration, contact electromigration, oxide breakdown, bias temperature instability or hot carrier injection into the gate oxide are only some types of defects that arise when transistors age under even normal use. Aging of transistors can result in a higher voltage required to turn on a transistor, or a slower turn-on time.

SUMMARY

In accordance with some embodiments of the presented principles, presented herein is a system and method for providing a critical path replica system in a circuit, the critical path replica replicating a path in the circuit for testing the physical parameters of the circuit during operation without interfering with the circuit operation. A circuit may comprise at least one functional logic module having at least one functional logic element and a replica data control module configured to provide a test signal. The circuit may further comprise at least one replica logic module and a replica error detection module. The replica logic module and processes the test signal to generate a processed signal and comprises one or more logic elements. In some embodiments, the replica logic module further comprises one or more load modules. Each of the logic elements is configured to replicate one or more of the functional logic elements, and each load module is associated with a logic element and applies a load to an output of the associated logic element. The replica error detection module is configured to analyze the processed signal to determine whether a timing violation has occurred in the replica logic module and generate an error report. A replica controller may be configured to modify operation of the circuit based on the error report.

In some embodiments, a replica mode control module may be configured set the replica logic module to an aging test mode and a timing sensor mode. The replica mode control module is configured to set the replica logic module to the aging test mode by providing data from the data bus to the replica logic module. The data from the data bus may be substantially the same data provided to the functional logic element being replicated by a logic element. The replica mode control module may further be configured to set the replica logic module to the timing sensor mode by providing a predetermined data configuration to the replica logic module. In some embodiments, the predetermined data configuration may create an inverter configuration in the replica logic module.

The replica error detection module is configured to analyze the processed signal by comparing the processed signal to a reference signal. In some embodiments, the test signal and reference signal are a clock signal. The replica data control module may generate the test signal by dividing a frequency of an operating clock signal by two.

A method for creating a critical path replica system may comprise determining a critical path in a circuit from an initial netlist, determining critical path cells, generating a critical path replica circuit, generating an updated netlist having critical path replica circuit elements, and generating a circuit blueprint representing a circuit with the critical path and the critical path replica circuit. A circuit having a critical path replica system may be created based on the circuit blueprint. The critical path may be replicated to generate the critical path replica circuit and replicating the critical path may comprise duplicating elements of the critical path in the critical path replica circuit. Loads for critical path elements may be determined and one or more load modules generated in the netlist.

The circuit blueprint is generated by placing and routing the elements and connections of the circuit and the critical path replica. The circuit blueprint may be iteratively analyzed and modified until parameters of the circuit having the critical path and critical path replica circuit represented by the circuit blueprint fall within predetermined guidelines. In some embodiments, the critical path and the critical path replica circuit are placed in the same region of the circuit.

BRIEF DESCRIPTION OF THE DRAWINGS

For a more complete understanding of the presented principles, and the advantages thereof, reference is now made to the following descriptions taken in conjunction with the accompanying drawing, in which.

DETAILED DESCRIPTION OF ILLUSTRATIVE EMBODIMENTS

Figure 1:
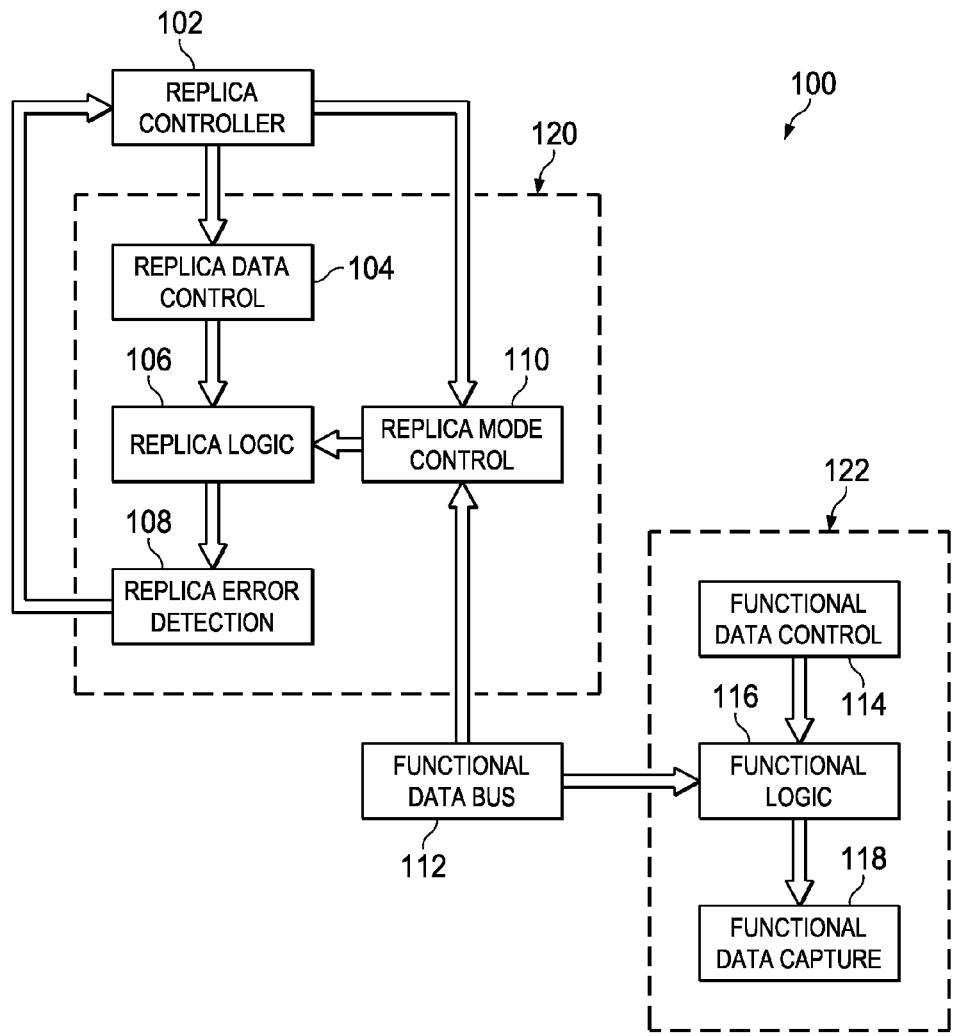
FIG. 1 illustrates a modular critical path replica system.

The making and using of the presented embodiments are discussed in detail below. It should be appreciated, however, that the present disclosure provides many applicable concepts that can be embodied in a wide variety of specific contexts. The specific embodiments discussed are merely illustrative of specific ways to make and use the described package, and do not limit the scope of the disclosure.

Embodiments will be described with respect to a specific context, namely critical path replica circuits useful in, for example, timing and aging testing of logic circuits. Other embodiments may also be applied, however, to other electrically connected components, including, but not limited to, registers, memory, instruction pipelines, circuit management components, processors, displays, input components, or combinations of any type of discrete and integrated circuit or electrical component.

The embodiments of the present disclosure are described with reference to FIGS. 1 through 6, and variations of the embodiments are also discussed. Throughout the various views and illustrative embodiments of the present disclosure, like reference numbers are used to designate like elements. Additionally, the drawings are intended to be illustrative, are not to scale and not intended to be limiting.

The present concepts are directed to providing a system and method for creating replicas or models of critical paths in electrical circuits, and modules for testing the timing and aging of components in the critical path. One or more sub-circuits or combinations of components in an integrated circuit maybe identified as a critical path. A critical path may be a sub-circuit that has a timing delay or timing pattern that affects other portions of the overall circuit. A replica or approximation of the critical paths of a circuit may be integrated into the circuit design so that each replica emulates the associated critical path, allowing testing and analysis of an equivalent to the critical path without interfering with operation or design of the critical path itself.

In some embodiments, the critical path replica spatially replicates the associated critical path and may be physically located on a die in the same region as the critical path, or as close to the associated critical path as possible in order to increase the accuracy of the replica. This minimizes any process variations between critical path components and replica components. In one embodiment, the critical path replica may be located on a die within a predetermined distance from the critical path. The predetermined distance may be a distance calculated to bring the critical path replica within a desired process variation window of the critical path. For example, in a circuit where MOSFET gates comprise the bulk of the logic elements, the critical path replica may spatially replicate a critical path by being within a distance where the gate oxide thickness varies by, for example, less than one standard deviation, or as another example, where the gate oxide thickness is calculated or otherwise determined to vary by less than 1%, 3%, or the like. This may be accomplished by taking the original circuit design including the critical path and re-routing elements or paths adjacent to, or near, the critical path so that the critical path replica may be placed adjacent to, or near, the critical path to be replicated. While the foregoing example is directed to determining a distance within which the critical path replica is disposed in relation to the critical path based on a gate oxide thickness, skilled practitioners will recognize that one or more any suitable process or fabrication parameters may be used. For example, and without limiting the scope of the present principles, calculated or measured variations in doping profile, feature size, within-wafer die location, saturation current, maximum voltage, leakage current, device capacitance, circuit delay, induced capacitance or other suitable parameters may be used to determine how close a critical path replica will be to a critical path to accurately spatially replicate the critical path.

FIG. 1 illustrates a modular critical patch replica system 100 according to an embodiment of the present principles. A replica controller 102 controls one or more replica modules 120. The replica module 120 may be comprised of a replica data control module 104, which is in signal communication with a replica logic module 106, which, may in turn be in signal communication with a replica error detection module 108. The replica module 120 may further comprise a replica mode control module 110 in signal communication with the replica logic module 106.

The functional logic module 116 may be a portion of the logic or circuit found in a die or chip. In some embodiments, the functional logic module may be a critical path in a circuit. Such critical path may be a portion of a circuit that controls or affects operation of the overall circuit, or other parts of the circuit.

A functional module 122 may have a functional logic module 116 in signal communication with a functional data control module 114 and a functional data capture module 118. A data bus 112 may be in signal communication with the replica mode control module 110 and the functional logic module 116. The functional data control module 114 controls data flow into the functional logic module 116, and may be a part of the circuit outside the critical path denoted by a particular functional logic module 116. The functional data capture module 118 may also be a part of the circuit using or receiving data coming from the functional logic module 116.

The functional logic module 116 may have one or more logic gates connected in series to process discrete inputs. In some embodiments, the logic gates of the functional logic module 116 may be a combination of Boolean logic devices. For example, the logic gates may be a combination of NAND, AND, NOR, OR, XOR and NOT gates, or the like. Similarly, the replica logic module 106 may have a plurality of logic gates forming a logic circuit emulating a logic circuit in the functional logic module 116. Alternatively, the replica logic module 106 may have other, non-boolean devices. The functional logic module 116 may, in some instances, be comprised solely of non-boolean devices, or a combination of device types.

The propagation delay or gate delay for a logic device is the length of time which between when the input to a logic gate becomes stable and valid, to the time that the output of that logic gate is stable and valid. Often this refers to the time required for the output to reach from 10% to 90% of its final output level when the input changes. Reducing gate delays in digital circuits allows them to process data at a faster rate and improve overall performance.

The most basic form of a logic gate has two digital inputs, and uses a combination of transistors to derive a single digital output from the two inputs. However, the presented principles are not limited to any particular type of logic gate. The logic gates may have any number of inputs, and various logic gates may have differing input counts. A logic gate's delay may be determined by the number of transistors a given signal must pass through, as well as the technology used to form each transistor. Transistor gate sizing, gate oxide capacitance, temperature and device aging may contribute to individual transistor turn-on times, and the overall logic gate delay. Likewise, operating parameters such as marginal supply voltage, output load capacitance may also affect a logic gate's delay.

The replica logic module 106 may have components replicating the functional logic module 116. The replica logic module 106 may be formed on a die or chip in a proximity to the functional logic module resulting in substantially the same performance between the devices of the replica logic module 106 and the functional logic module 116. In some embodiments, the physical proximity on the die of the replica logic module 106 and the functional logic module 116 may be such that the process variation between devices of the replica logic module 106 and the functional logic module 116 is negligible or substantially zero. Thus, the components of the replica logic module 106 and the functional logic module have substantially the same physical characteristics after manufacturing, and experience the same aging degradation during use.

In some embodiments, the replica logic module 106 may be a duplicate of the functional logic module 116, having substantially duplicated components and circuit layout. In some embodiments, a replica logic module may have components or sub-circuits that are equivalents of elements in the functional logic module 116. Skilled artisans will recognize that the constituent elements of the replica logic module 106 will be dictated by the components of the functional logic module 116. For example, an AND gate with negated inputs in the functional logic module 116 may be replaced with a NOR gate for simplicity. However, in such an example, the delay introduced by the AND gate with the negated inputs should also be replicated by the replacement NOR gate by adding additional elements having a compensating capacitance or delay. In another example, a capacitor may be connected to a logic gate output to simulate the delay created by a connection outside of the critical path. In yet another example, a pair of inverters in series may be used to simulate the gate delay from a non-logic transistor or gate.

The replica controller 102 may contain elements that control the activation and analysis of one or more replica modules 120. Each replica module 120 may be activated or deactivated separately by the replica controller 102.

Additionally, the replica controller 102 may be used to switch each replica logic module 106 between an aging test mode and a timing sensor mode. The replica mode control module 110 may be controlled by the replica controller 102 and may switch the external data inputs of the replica logic module 106 between live data and a predetermined data set. In some embodiments, the timing sensor mode may be generally turned on, and the aging test mode may be selected at predetermined intervals, or in response to a predetermined event or command. The timing sensor mode may be where the replica module 120 uses predetermined or set data inputs to the replica module to simulate, for example, the predetermined data set resulting in a worst case delay configuration or an overall inverting configuration. The aging test mode may be where the replica logic module 106 uses the same data inputs or data signals as the replicated functional logic module 116. The data bus 112 may provide data to the functional logic module 116, and in the aging test mode, the replica mode control module 110 may map data inputs from the data bus 112 to components in the replica logic module 106.

The replica data control module 104 controls the clock used to oscillate the timing circuit for the replica logic module 106. The replica error detection module 108 receives a processed signal from the replica logic module 106 and then determines whether the replica logic module 106 has experienced a timing error or violation. In some embodiments, the replica error detection module 108 may compare the processed signal against a reference signal to determine whether the replica logic module circuit has delayed the test signal 208 to the point where it fails to match the reference signal. The replica error detection module 108 may communicate a timing violation to the replica controller 102. The replica controller 102 may receive error reports or signals from the replica error detection module 108 in one or more of the replica modules 120, and take some action based on the error reports. In some embodiments, for example, the replica controller 102 may scale the operating frequency or voltage of the overall circuit, or a portion of the circuit when the number or frequency of error reports exceeds a predetermined threshold. For example, in a processor die, when a replica logic module 106 replicating a memory bus controller experiences timing violations, the memory bus controller operating frequency may be scaled down, while the processor core maintains its original operating frequency. Alternatively, on other examples, the processor core operating frequency may be scaled down and voltage scaled up when a register or other critical path replica logic module 106 in the processor core experiences timing violations greater than a predetermined threshold in a fixed time period. In some embodiments, the replica controller may also be configured to determine whether a particular replica logic module 106 or replica circuit malfunctions, and may further ignore or disable the faulty element.

The dynamic voltage or frequency scaling may be permanent or temporary. For example, when the replica logic module 106 experiences a timing violation when in aging mode, the timing violation may indicate deterioration of the functional logic module 116, and the replica controller 102 may cause the overall circuit to permanently scale down the operating frequency or scale up the operating voltage. As another example, the replica controller 102 may dynamically scale the frequency or voltage of a circuit when replica logic module 106 experiences timing violation while operating in the timing sensor mode. Such timing violations during the timing sensor mode may be due to excess heat or other operating conditions occurring during circuit operation that may change at various times. Thus, the frequency or voltage may be scaled back to the original operating points once the adverse operating conditions recede.

In some embodiments, the replica controller 102 may modify the operation of the overall circuit based on one or more error reports generated by the replica error detection module 108. For example, the replica controller 102 may variably scale the frequency or voltage depending on a frequency or number of error violations reported. In such an embodiment, if the replica controller 102 receives error reports from a number of replica logic modules 106 exceeding a first threshold, the replica controller 102 may scale the frequency or voltage to a first point, and from a number of replica logic modules 106 exceeding a second point, the replica controller 102 may scale the frequency or voltage to a second point. For example, a circuit operating at 1 GHz that has 10 out of 100 replica modules 120 reporting a timing violation within one minute may be throttled, or have the frequency scaled, to 900 MHz. The same circuit may be throttled to 700 MHz when 20 out of 100 replica modules 120 report timing violations in the same time period. Skilled artisans will recognize that any operating parameter, such as voltage, frequency, data throughput, instruction set, another parameter, or any combination of operating parameters may be scaled, controlled, or even shut down in response to timing violations. Additionally, the number of control or throttling steps used to control the operating parameters is not limited to any particular number, and may not even be executed in discrete steps. For example, a circuit may be throttled according to a predetermined formula.

Figure 2:
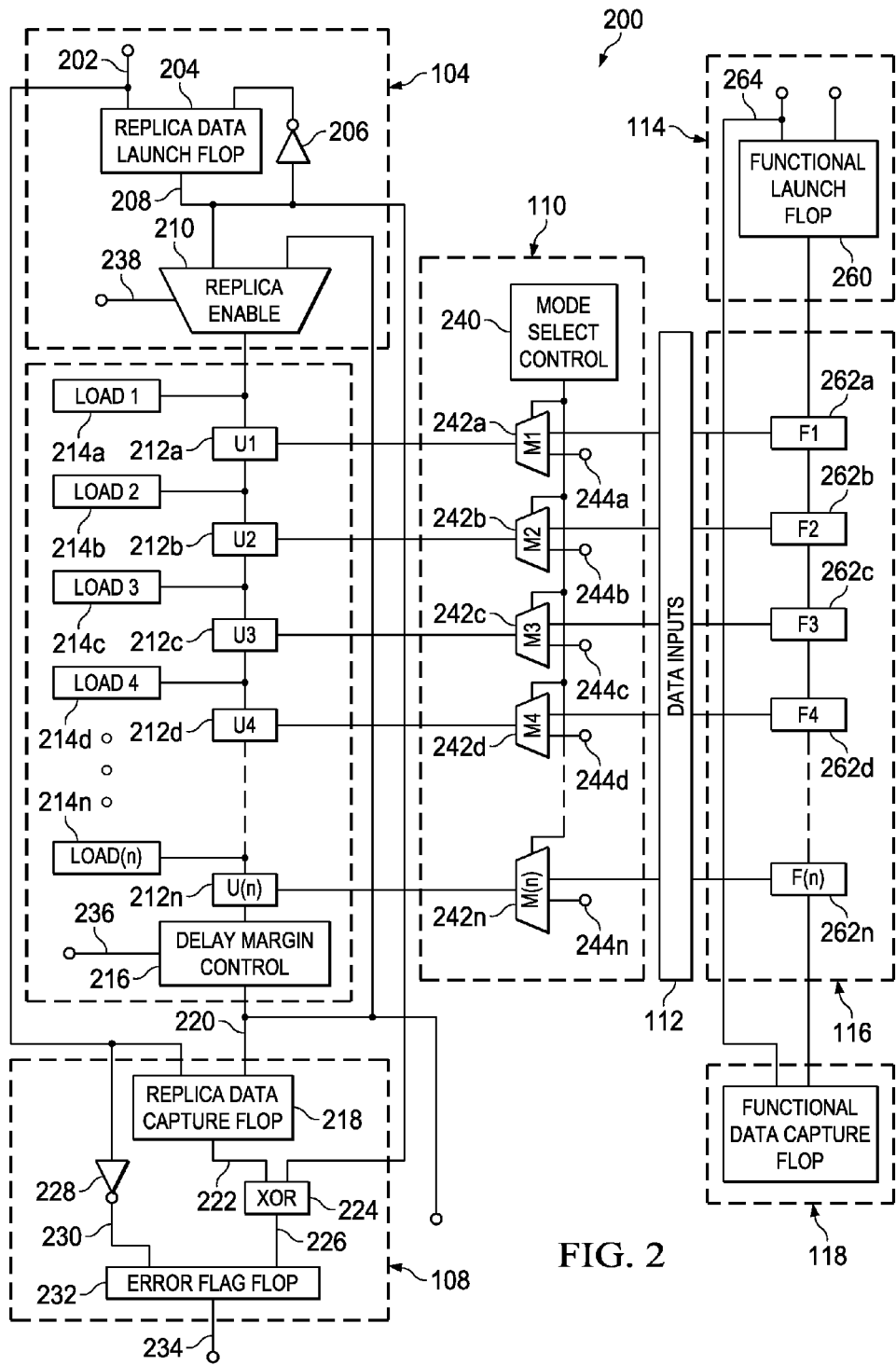
FIG. 2 illustrates an embodiment of a critical path replica system according to the present principles.

FIG. 2 illustrates an embodiment of a critical path replica system 200 according to the present principles. A replica may be created to replicate a critical path in the overall circuit. The critical path comprises a functional logic module 116 with one or more functional logic elements 262a, 262b, 262c, 262d . . . 262n. The functional data control module 114 may have a functional data launch module 260 or other component or circuit for supplying data to the functional logic module 116. A clock signal 264 may drive the functional data launch module 260 when, for example, the functional data launch module is a logic component such as a D-type flip-flop. In some embodiments, the clock signal 264 may be a clock signal used to drive the overall circuit. The functional data capture module 118 be connected to the functional logic module 116, and may comprise a D-type flip-flop for example, driven by the clock signal 264.

The replica data control module 104, may in some embodiments, provide a test signal 208 to the replica logic module 106. The test signal 208 may, for example, be a binary clock signal. In the non-limiting, illustrated embodiment, the replica data control module 104 may receive a clock signal 202, such as an operating clock signal at a replica data launch flop 204, which may in some embodiments, be a D flip-flop. A data clock inverter 206 may be connected to the output of the replica data launch flop 204 and invert that output signal to the data input of the same replica data launch flop 204 resulting in a divide-by-2 clock. Thus, the replica data control module 104 provides a test signal 208 that is the clock signal 202 at half the frequency of the clock signal 202. The test signal 208 is provided to a replica enable multiplexer 210, which is controlled by an enable signal 238, and activates the replica logic module 106 by passing the test signal 208 through to the replica logic module 106 components. The replica logic module 106 may be comprised of logic elements 212a, 212b, 212c, 212d . . . 212n in any configuration. While the logic elements 212a-n are shown in series, the logic elements may be arranged in any configuration that replicates the critical path denoted by the functional logic module 116.

The replica logic module 106 may further comprise one or more load modules 214a, 214b, 214c, 214d . . . 212n. Each logic element 212a-n, or a group of logic modules 212a-n may have an associated load module 214a-n, which may comprise one or more elements applying a load to the output of a logic element 212a-n. For example, a load module 214a-n may compensate for any missing load occurring in the overall circuit that is not present in the critical path itself, or that was part of the critical circuit and affecting a functional logic element 262a-n but omitted from the replica logic module 106. For example, in some embodiments, a logic element 212a-n may replicate a logic element in the critical path that drives a transistor outside of the critical path. Such transistor may have capacitance that acts as a load on the replicated element. The load module 214a-n may replicate the outside capacitive load of the transistor. The capacitive load may be replicated because a capacitive load may affect the time required for a logic element 212a-n to drive an output signal above a predetermined voltage level, affecting the timing pattern of the critical path. However, in some embodiments, the load module 214a-n may not be a duplicate of the load element being replicated, as the critical path being analyzed does not travel through the load element being replicated.

The replica logic module 106 may optionally comprise a delay margin control module 216 that increases the delay of the logic module 106. In some embodiments, the delay margin control may be controlled by the replica controller 102 to change the delay or adjust the testing parameters of the circuit in while in the aging test mode or timing sensor mode. The test signal 208 is passed through the replica enable multiplexer 210 to the logic elements 212a-n. The test signal 208 is processed by the logic elements 212a-n and delay margin control module 216 to form a processed signal 220 which is communicated to the replica error detection module 108.

The replica error detection module 108, in some embodiments, may have a replica data capture module 218. In one embodiment, the replica data capture module 218 may be a discrete component such as a D-type flip-flop, which may be triggered by the clock signal 202 to read and hold the processed signal 220. The resulting signal held by the replica data capture module 218 may be a result signal 222, which may, in some embodiments, be compared to a reference signal by an error analysis module 224. In some embodiments, the error analysis module 224 may be a XOR gate. The error analysis module 224 may generate an error signal 226 that is communicated to an error flag module 232, which in some embodiments, may be a D-type flip-flop triggered by an inverted clock signal 230 generated by the clock signal 202 passing through an inverter 228. The error flag module 232 may then assert and hold an error flag signal 234 as an error report. The error report or error flag signal 234 may be communicated back to the replica controller 102.

While the components comprising the replica error detection module 108 are described in terms of discrete components, skilled artisans will recognize that any suitable components may be used for signal analysis and error detection. For example, in embodiments, a processor core may be used to capture and analyze the signal against a stored or generated reference signal.

Thus, the replica logic module 106 processes the test signal 208 to generate the processed signal 220, which is analyzed by the replica error detection module 108, which in turn asserts an error flag signal when a timing violation occurs. In some embodiments, the logic elements 212a-n may be solely Boolean devices, and a digital test signal 208 may be maintained in substantially original form. In such an embodiment, the reference signal may be the same as the test signal 208, and the processed signal 220 or result signal 222 may be compared directly to the test signal 208. Additionally, the test signal 208 is not limited to a clock signal, but may be any usable signal. The reference signal may also be any signal useful for determining if a timing violation has occurred in the replica logic module 106. For example, where a critical path requires two inputs, the reference signal may be a signal reflecting a result signal 222 expected to be generated from the multiple inputs. Additionally, the reference signal need not be a signal, but may be a signal profile, formula, or any other comparison data. For example, the replica error detection module 108 may be a processor, with a formula representing an expected processed signal 220 stored in memory. The processed signal 220 may be analyzed against the stored formula to determine whether the processed signal 220 varies more than a predetermined amount from values generated according to the stored formula. In other embodiments, the processed signal 220 may be analyzed against a representation of a signal, stored signal, stored values or other stored data. In yet other embodiment, a reference signal may be received in the replica error detection module 108 from any source outside the replica error detection module 108, including a reference signal from another portion of the overall circuit, from another critical path replica system 100, from a source external to the circuit, or another source.

A replica mode control module 110 may optionally be used to control the mode under which the replica logic module 106 operates. In one embodiment the replica mode control module 110 may comprise, in part, a mode select control module 240, which may control the select line on one or more mode switches 242a, 242b, 242c, 242d . . . 242n. The mode switches 242a-n may, in some embodiments, be discrete multiplexers, or another switching device. In some embodiments, the replica mode control module 110 may be omitted, with the replica logic module 106 functioning solely in aging test mode or timing sensor mode.

Each mode switch 242a-n may be associated with one or more logic elements 212a-n to provide a signal to the associated logic element 212a-n from the data bus 112 or from a delay input 244a, 244b, 244c, 244d . . . 244n. In some embodiments, when in the aging test mode, the data bus 112 may provide the same data to the replica logic module 106 that is provided to the functional logic module 116, with the logic elements 212a-n receiving substantially the same data inputs as the corresponding replicated functional logic elements 262a-n. Thus, the timing characteristics of the critical path may be analyzed without interfering with the signal propagating through the critical path in the functional logic module 116. In other embodiments, when in timing sensor mode, the mode switches 242a-n may supply a predetermined data configuration from delay inputs 244a-n. In such embodiments, the data configuration may be a predetermined based on the elements making up each logic element 212 and may result in a predetermined logic gate configuration. For example, the delay inputs 244a-n may provide data creating a worst case delay arrangement within the logic elements 212a-n. In another example, the delay inputs 244a-n may provide data to logic elements 212a-n resulting on an overall inverter configuration within the replica logic module 106. Skilled artisans will recognize that individual logic elements may have one or more delay inputs 244a-n providing data thereto, and that the signals provided by the delay inputs 244a-n may be arranged in any predetermined configuration. Additionally, the delay inputs 244a-n may be connected to one or more circuits or processors that provide a dynamic data configuration to result in a desired logic element configuration. For example, individual logic elements 212a-n may be individually tested for delay violations by setting the delay input 244a-n of each logic element 212a-n to an inverter or least delay configuration, and individual logic elements 212a-n set to a worst case delay configuration as the circuit is tested to determine which logic element 212a-n creates the greatest delay.

Figure 5:
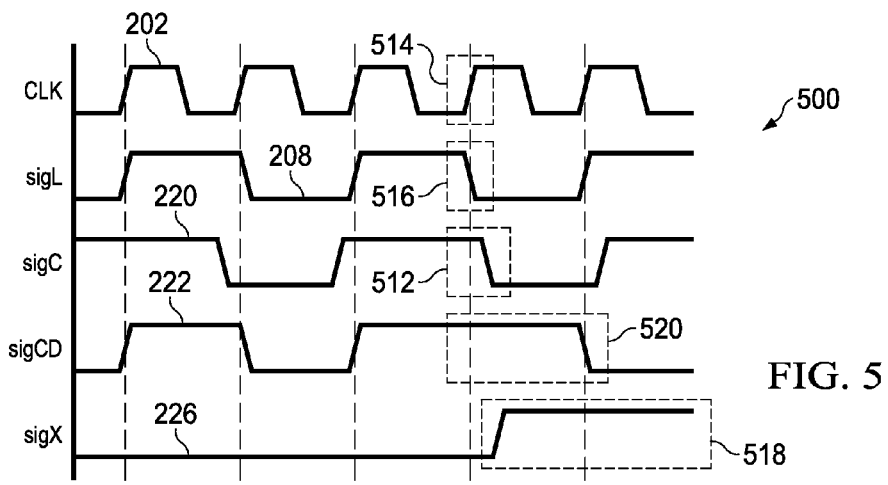
FIG. 5 illustrates an example of a timing diagram for a replicated critical path.

FIG. 5 illustrates an example of a timing diagram for a replicated critical path. Such a timing diagram may represent an embodiment of the signals resulting from the testing of a replica logic diagram 106 as illustrated above in FIG. 2.

In an aging test mode or a timing sensor mode, a clock signal 202 may be a regular binary signal that activates or triggers the data and logic components in a critical path replica. A replica data control module 104 may act as a divide-by-2 clock to generate a binary test signal 208 at half the frequency of the clock signal 202. A processed signal 220 may show some variance from the test signal 208 after being processed by the replica logic module 106. An error may be indicated where a signal bit fails to switch states at the appropriate portion of the clock signal 202 cycle 514. The processed signal 220 error interval 512 is detected by the replica error detection module 108, for example, by remaining high when replica data capture module 218 is activated by the relevant clock signal 202 cycle 514, causing the result signal 222 to maintain an out-of-phase data bit 520. In the illustrated embodiment, the reference signal is the test signal 208. The result signal 222 out-of-phase data bit 520 causes a XOR gate error analysis module 224 to assert an error flag 518 in an error signal 226 when the result signal 222 no longer matches the test signal 208 or reference signal. An error flag module 232 then receive 2 the error flag and asserts or communicates the error to a handling circuit such as a replica controller 102.

Figure 3:
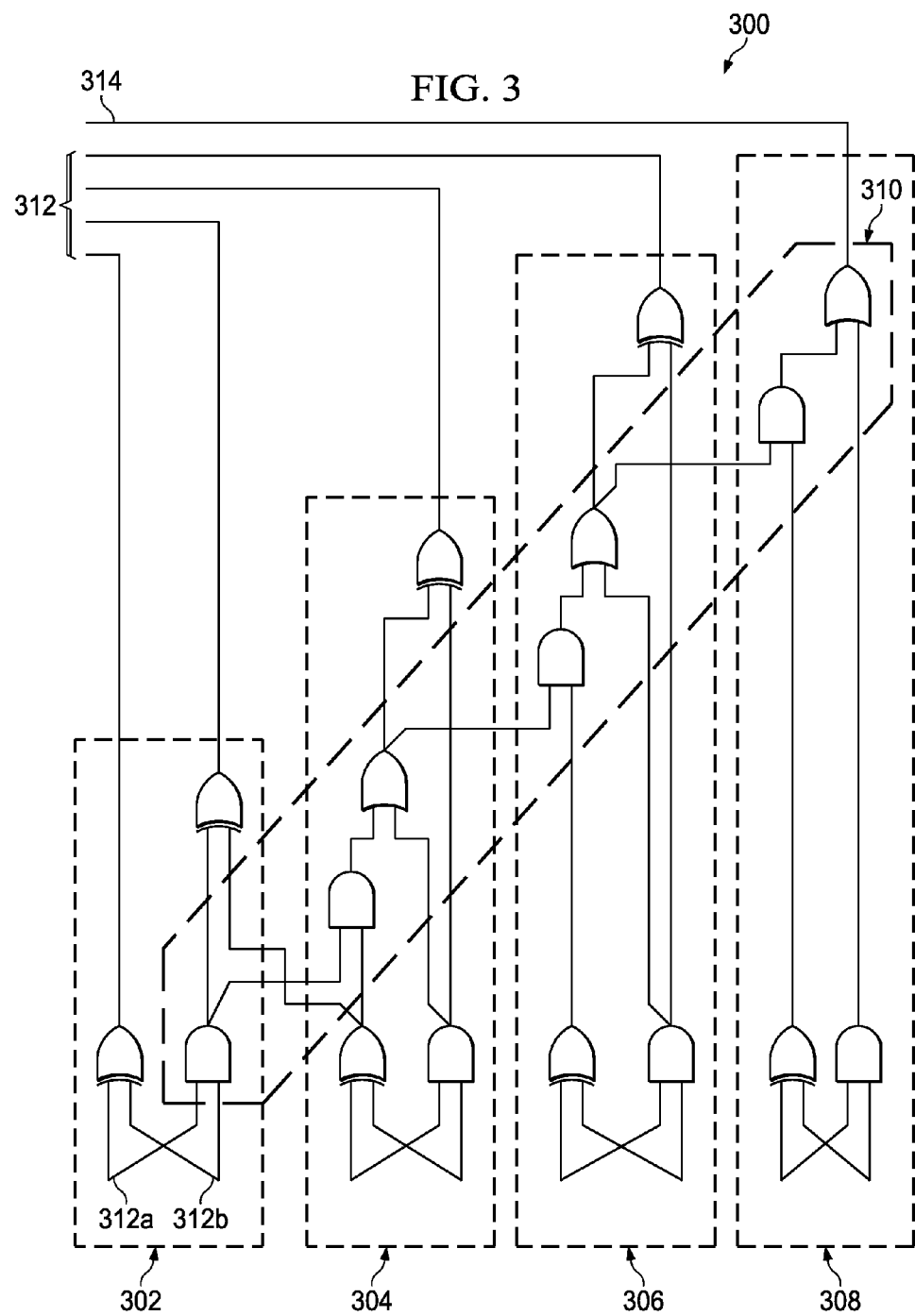
FIG. 3 illustrates an example of a combinational logic system.

FIG. 3 illustrates an embodiment of a combinational logic system 300. In this simple embodiment, a 4-bit adder is depicted, comprising a half adder in the least significant bit 302, and three full adders in the third bit 304, second bit 306 and most significant bit 308. The adders are arranged in a cascading carry arrangement, with 4 output lines 312 representing the sum of the inputs 312a, 312b and a carry line 314 representing a carry out, or fifth bit carry. The cascading arrangement causes a carry bit from the least significant bit inputs 312a and 312b to cascade through the carry gates of the third bit 304, second bit 306 and most significant bit 308. Thus when a 4-bit adder comprises an overall circuit, or part of an overall circuit, a critical path 310 may be determined from the path a signal would take through the longest, or slowest logic path. In the illustrated 4-bit adder, the critical path 310 would be the cascading carry gates because the least significant bit inputs 312a and 312b would have to cascade through each adder's carry gates to the most significant bit 308 carry gates, and then out to the carry line 314.

Figure 4:
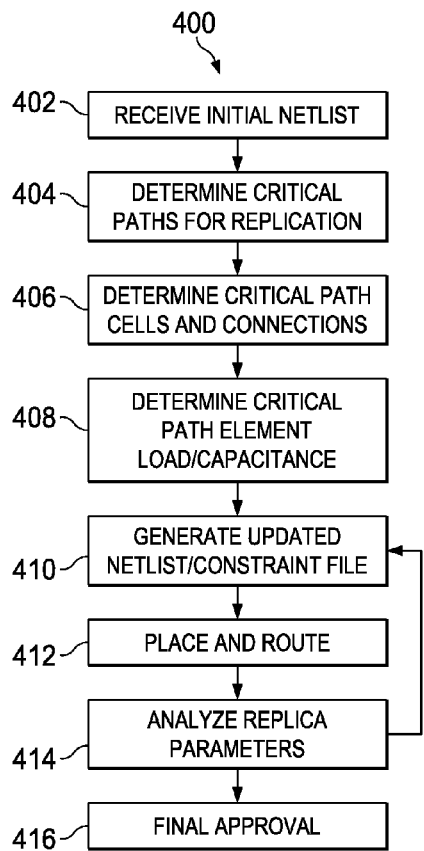
FIG. 4 illustrates a method for creating a critical path replica system.

FIG. 4 illustrates a method 400 for creating a critical path replica system 100. In some embodiments, the creation of the critical path system may be performed with a replica tool comprising software, hardware or a combination of both. In some embodiments, the replica tool may comprise software residing on a computing system for executing the tool and interacting with one or more other existing tools to create a circuit having a critical path replica system 100. Initially, the replica tool may receive an initial netlist in block 402. The netlist may be an electronic list of component, and the connections between those components. The netlist may be a gate level netlist, for example. In some embodiments, the netlist may be generated by a circuit design tool and exported electronically to the replica tool. In other embodiments, the netlist may be created manually, or through the use of prebuilt sub-circuits from, for example, a circuit library. The netlist may define the overall circuit, or a portion of an overall circuit, and may have the elements defined in one or more functional logic modules 116 included therein.

The replica tool may, in block 404, determine the critical paths for replication. The critical paths for replication may be automatically generated by the replica tool, or by another automated tool, and may be based calculated from the components in the netlist. In some embodiments, the critical paths for replication may be designated manually. In yet other embodiments, the critical paths may be derived from a set of critical paths associated with known subcircuits from the circuit library, or by recognizing a predetermined pattern in the netlist that has an associated critical path definition.

The replica tool may, in block 406, determine the critical path cells and connections. In some embodiments, the replica tool may also generate placement constraints for the replica logic modules 106 as well. The critical paths determined in block 404 may be replicated to generate the components for a replica logic module 106 by forming an equivalent circuit. In some embodiments, the elements of the critical path may be substantially duplicated, or in other embodiments, component or subcircuit equivalents may be determined or calculated to form logic elements 212a-n in the replica logic module 106. The connections, and additional components associated with the replica logic block may also be determined in block 406. In some embodiments, the initial netlist may include dummy elements in place of calculated replica elements and an initial placement constraint file generated based on the relationship of the replica elements to the replicated elements. The replica tool may generate the placement constraints based on known or desired parameters, or the replica tool may receive rules or parameters which the replica tool may use to spatially replicate the critical path circuits.

In some embodiments, the connections to a clock providing a clock signal 202 may be included, and any additional inputs, such as data bus 112 connections or connections for predetermined data input sources for delay inputs 244a-n determined. Additionally, the replica mode control module 110 may be designed into the replica, along with the replica data control module 104 and the replica error detection module 108. The replica controller 102, and any associated top logic may also be inserted. In some embodiments, options for the layout and functionality of the replica may be used to automate the design and development of the replica circuit. For example, the replica may be designated as having only an aging test mode, and the mode select module and any associated mode switches 242a-n may be omitted, and the logic elements 212a-n may be connected directly to the data bus 112. In other embodiments, the replica may have both an aging test mode and a timing sensor mode, and the replica tool may create mode switches 242a-n having the required number of inputs and outputs for a particular logic element 212a-n. For example, where a replicated functional logic element 262a-n receives four logic inputs from outside of the critical path, the replica tool may generate or create a four output switch, with four inputs connected to the data bus, four inputs connected to delay inputs with fixed or predetermined logical values, and four outputs connected to the four inputs of a logic element 212. Thus, a mode switch 242a-n may switch all of its inputs at once or in response to a single switch signal to control the mode of that particular logic element 212a-n.

The critical path element load or capacitance may be calculated in block 408. The replica tool may calculate the values or components comprising each load module 214a-n. The loads may be capacitances, resistances, or other circuit characteristics. Additionally, the load may be calculated based on the portion of the overall circuit outside of the critical patch connected to a particular logic element 262a-n, or generated from a predetermined load value from, for example, a circuit library having a load associated with a particular subcircuit. Alternatively, the load may be determined from measurements on the functional logic module 116. The loads of the critical path elements may be replicated in the netlist by creating one or more load modules 214a-n in the netlist.

In block 410, an updated netlist or placement constraint file may be generated. The circuit or components and connection information for the replica modules may be inserted into the netlist to generate an updated netlist or constraint file having critical path replica circuit elements. Additionally, the netlist or placement constraint file may comprise requirements for the placement of replica circuits in relation to the critical paths to ensure that the replica circuits spatially replicate the critical paths to a desired accuracy.

In block 412, the updated netlist may then be run through a place-and-route tool to generate a circuit blueprint or schema including the replica circuit information. In block 414, the replica modules may be analyzed to finalize the replica circuit components. The circuit blueprint generated by the place-and-route routine may be analyzed for timing verification to ensure that the addition of the replica circuits or the placement and routing of components and connections did not change the timing of the circuit beyond acceptable parameters. Should the resulting circuit blueprint change the circuit timing beyond the acceptable parameters, the replica tool may return to block 410 and revise the netlist or constraint file and associated circuit blueprint. Thus, the circuit blueprint with the critical path replica circuits may be iteratively modified and analyzed until the parameters of the circuit having the critical path replica circuit represented by the circuit blueprint fall within predetermined guidelines.

Once the replica parameters are acceptable, the resulting critical path replica system 100 may be finalized and approved for production in block 416. Subsequently, a circuit may be created from the circuit blueprint.

Figure 6:
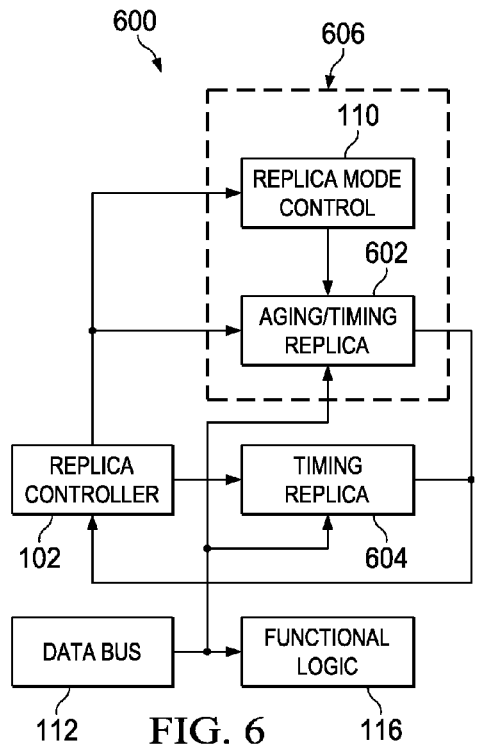
FIG. 6 illustrates an embodiment of a critical path replica system with timing feedback.

FIG. 6 illustrates an embodiment of a critical path replica system with timing feedback 600 according to the present principles. In such a system, a functional logic module 116 may be replicated by primary replica module 606 and a dedicated timing replica module 604. During operation of the functional logic module, the dedicated timing replica module 604 may be used to determine a delay or timing margin, and the primary replica module 606 may be used to gather feedback. Thus, in some embodiments, there may be two critical path replicas.

The primary replica module 602 may be configured to act as an aging replica and a timing replica, as described above with respect to replica logic module 106. A replica controller 102 may control the operational mode of an aging/timing replica module 602. In one embodiment, the replica controller 102 may be in signal communication with a replica mode controller 110 in the primary replica module 606 which may activate the aging/timing replica 602 or switch the aging/timing replica between aging test mode and timing test mode. The replica controller 102 may also be in signal communication with the aging/timing replica 602 and with a dedicated timing replica module 604. The aging/timing replica 602 and the dedicated timing replica module 604 may each optionally be in signal communication with the replica controller 102 to provide an output or feedback to the replica controller 102. A data bus 112 may be in signal communication with the aging/timing replica 602 and the dedicated timing replica module 604 to provide the same data provided to the functional logic module 116 of the critical path circuit.

In some embodiments, the replica controller 102 may attempt to match the delay in the dedicated timing replica module 604 and the primary replica module 606. The replica controller 102 may control the dedicated timing replica 602 by increasing the timing or delay margin to determine the maximum delay allowable at a particular operating point. The replica controller 102 may control a delay margin control module 216 in the dedicated timing replica module 604 to match the outputs of the dedicated timing replica module 604 and the primary replica module. The replica controller 102 may set the aging/timing replica 602 to a timing test mode, and compare the output to the output of the dedicated timing replica 604 while adjusting the delay of the timing replica 604 until the outputs fall within a predetermined threshold, or match within a predetermined tolerance. Thus, the replica controller 102 may determine what delay need be introduced into a replica circuit to achieve a desired performance.

While the principles presented herein have been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

What is claimed is:

1. A circuit comprising:
   at least one functional logic module disposed in a die and having at least one functional logic element;
   a replica data control module disposed in the die and configured to provide a test signal;
   at least one replica logic module disposed in the die adjacent to the at least one functional logic module, the at least one replica logic module duplicating the functionality of the at least one functional logic module and comprising logic elements configured to replicate the functionality of the at least one functional logic element, the at least one logic element configured to process the test signal and generate a processed signal; and
   a replica error detection module disposed in the die and configured to analyze the processed signal to determine whether a timing violation has occurred in the replica logic module.

2. The circuit of claim 1, further comprising:
   a replica mode control module configured set the replica logic module to an aging test mode and a timing sensor mode.

3. The circuit of claim 2, further comprising a data bus configured to provide data to the functional logic module, and wherein the replica mode control module is configured to set the replica logic module to the aging test mode by providing data from the data bus to the replica logic module.

4. The circuit of claim 2, wherein the replica mode control module is configured to set the replica logic module to the timing sensor mode by providing a predetermined data configuration to the replica logic module.

5. The circuit of claim 1, wherein the replica error detection module is configured to analyze the processed signal by comparing the processed signal to a reference signal.

6. The circuit of claim 1, wherein the at least one replica logic module spatially replicates a critical path of the at least one functional logic module and is disposed within a predetermined distance from the critical path sufficient to bring the performance of the at least one replica logic module within a desired process variation window.

7. The circuit of claim 1, the replica logic module further comprising one or more load modules, each load module associated with a logic element and applying a load to an output of the associated logic element.

8. The circuit of claim 1, wherein the replica logic module has one or more load modules each associated with one or more of the logic elements and configured to apply a load to the associated one or more logic elements.

9. A circuit comprising:
   a replica data control module configured to provide a test signal;
   at least one replica logic module disposed in a die adjacent to at least one functional logic module disposed in the die and having one or more functional logic elements, the at least one replica logic module approximating the functionality of the at least one functional logic module and comprising at least one logic element, each logic element configured to replicate the functionality of the one or more functional logic elements, the at least one logic element configured to process the test signal and generate a processed signal;
   a replica error detection module configured to analyze the processed signal and generate an error report; and
   a replica mode control module configured set the replica logic module to at least an aging test mode and a timing sensor mode.

10. The circuit of claim 9, further comprising a replica controller configured to modify operation of the circuit based on the error report.

11. The circuit of claim 10, further comprising at least one dedicated timing replica logic module configured to replicate the one or more functional logic elements in the circuit and having a delay margin control module disposed therein, and wherein the replica controller is further configured to receive an output from the dedicated timing replica logic module and from the replica logic module, and further configured to control the delay margin control module in the dedicated timing replica logic.

12. The circuit of claim 9, further comprising a data bus wherein the replica mode control module is configured to set the replica logic module to the aging test mode and provide data from the data bus to the replica logic module, the data from the data bus being substantially the same data provided to the functional logic element being replicated by a logic element.

13. The circuit of claim 9, further comprising a data bus configured to provide data to the functional logic elements in the circuit, and wherein the replica mode control module is configured to set the replica logic module to the timing sensor mode and provide a data configuration to the replica logic module to create an inverter configuration in the replica logic module.

14. The circuit of claim 9, wherein the replica error detection module comprises an error analysis module configured to compare a processed signal to a reference signal and generate an error signal when the processed signal and reference signal fail to match.

15. A circuit comprising:
   a functional logic module disposed in a die and having at least one functional logic element forming a critical path;
   a replica logic module disposed in the die adjacent to the functional logic module, the replica logic module having logic elements that approximate a functionality of the critical path, the logic elements configured to process a test signal using the approximated functionality of the critical path and generate a processed signal; and
   a replica error detection module disposed in the die, connected to the at least one replica logic module, and configured to analyze the processed signal to determine whether a timing violation has occurred in the replica logic module by comparing the processed signal to a reference signal.

16. The circuit of claim 15, further comprising a replica data control module disposed in the die, connected to the replica logic module, and configured to provide the test signal.

17. The circuit of claim 15, further comprising a replica mode control module configured set the replica logic module to an aging test mode and a timing sensor mode.

18. The circuit of claim 17, further comprising a data bus configured to provide data to the functional logic module, and wherein the replica mode control module is configured to set the replica logic module to the aging test mode by providing data from the data bus to the replica logic module.

19. The circuit of claim 17, wherein the replica mode control module is configured to set the replica logic module to the timing sensor mode by providing a predetermined data configuration to the replica logic module.

* * * * *